United States Patent
Pretlove et al.

(10) Patent No.: US 7,236,854 B2
(45) Date of Patent: Jun. 26, 2007

(54) METHOD AND A SYSTEM FOR PROGRAMMING AN INDUSTRIAL ROBOT

(75) Inventors: John Pretlove, Sandvika (NO); Charlotte Skourup, Drammen (NO); Thomas Pettersen, Larkollen (NO)

(73) Assignee: ABB Research Ltd., Zürich (CH)

( * ) Notice: Subject to any disclaimer, the term of this patent is extended or adjusted under 35 U.S.C. 154(b) by 121 days.

(21) Appl. No.: 10/751,012

(22) Filed: Jan. 5, 2004

(65) Prior Publication Data
US 2005/0149231 A1 Jul. 7, 2005

(51) Int. Cl.
G05B 19/04 (2006.01)

(52) U.S. Cl. .............. 700/246; 700/245; 700/251; 700/257; 318/568.12; 318/568.19; 318/568.22; 318/568.23; 901/1

(58) Field of Classification Search ........... 700/245, 700/259, 264, 246; 318/568.2
See application file for complete search history.

(56) References Cited

U.S. PATENT DOCUMENTS

| | | | | |
|---|---|---|---|---|
| 4,945,493 | A * | 7/1990 | Huang et al. ............. | 700/251 |
| 5,184,051 | A | 2/1993 | Schweiker et al. | |
| 5,724,489 | A | 3/1998 | Yamamoto et al. | |
| 6,507,163 | B1 * | 1/2003 | Allen .................... | 318/560 |
| 6,535,793 | B2 * | 3/2003 | Allard ................... | 700/259 |
| 6,757,586 | B2 * | 6/2004 | Milojevic et al. ....... | 700/245 |
| 6,845,295 | B2 * | 1/2005 | Cheng et al. ........... | 700/245 |
| 6,845,297 | B2 * | 1/2005 | Allard ................... | 700/259 |
| 7,039,500 | B2 * | 5/2006 | Milojevic et al. ....... | 700/245 |
| 7,079,924 | B2 * | 7/2006 | Galbraith ............... | 700/245 |
| 2004/0189675 | A1 * | 9/2004 | Pretlove et al. ......... | 345/633 |
| 2004/0193321 | A1 * | 9/2004 | Anfindsen et al. ....... | 700/257 |
| 2005/0251290 | A1 * | 11/2005 | Skourup et al. ......... | 700/245 |
| 2005/0256611 | A1 * | 11/2005 | Pretlove et al. ......... | 700/264 |

FOREIGN PATENT DOCUMENTS

JP 62274404 A 11/1987

(Continued)

OTHER PUBLICATIONS

Veyha et al., Method and system for robot end effector path correction using 3-D ultrasound sensors, 2000, IEEE, p. 1240-1243.*

(Continued)

*Primary Examiner*—Thomas Black
*Assistant Examiner*—McDieunel Marc
(74) *Attorney, Agent, or Firm*—Venable LLP; Eric J. Franklin (57) ABSTRACT

A method and a system for use in connection with programming of an industrial robot. The programming includes teaching the robot a path having a number of waypoints located on or in the vicinity of an object to be processed by the robot. The system includes elements for obtaining information about the waypoints of the path in relation to the object, a storage unit for storing the obtained information, a simulation unit for simulating the robot path based on the obtained information about the waypoints and a model of the robot, a graphics generator for generating a graphical representation of the simulated robot path, and a display member for displaying a view comprising the object and the graphical representation of the robot path projected on the object.

15 Claims, 4 Drawing Sheets

FOREIGN PATENT DOCUMENTS

| | | |
|---|---|---|
| JP | 09225872 A | 9/1997 |
| JP | 10011122 | 1/1998 |
| JP | 11058276 A | 3/1999 |

OTHER PUBLICATIONS

Vaughan et al., Exploiting task regularities to transform between reference frames in robot teams, 2002, IEEE, p. 2599-2605.*

Dixon et al., Predictive robot programming, 2002, IEEE, p. 876-881.*

Vaughan et al., LOST: Localization-space trails for robot teams, 2002, IEEE, p. 796-812.*

* cited by examiner

METHOD AND A SYSTEM FOR PROGRAMMING AN INDUSTRIAL ROBOT

FIELD OF THE INVENTION

The present invention relates to a method in connection with programming of an industrial robot, comprising teaching the robot a path which has a number of waypoints located on or in the vicinity of an object to be processed by the robot. The processing of the object could be any type of surface processing application carried out by an industrial robot, such as painting, glazing, sanding, polishing, grinding, welding, picking and placing, and assembling.

The present invention also relates to a computer program product directly loadable into the internal memory of a computer, comprising software code portions for performing the steps of the method according to the invention, when said product is run on a computer.

The present invention also relates to a computer readable medium having a program recorded thereon, where the program is to make a computer perform the steps of the method according to the invention when said program is run on the computer.

The present invention also relates to the use of a method according to the invention for a paint application.

The present invention further relates to a system for use in connection with programming of an industrial robot, the system comprising information obtaining means, obtaining information about the waypoints of the path in relation to the object, a storage unit, for storing the obtained information, a graphics generator, generating a graphical representation, and a display member displaying a view comprising the object and the graphical representation generated by the graphics generator.

PRIOR ART

Robots are often used for processing the surface of an object. Existing practice for programming a robot involves teaching the robot a sequence of waypoints. The waypoints define the path, which the robot shall follow during the processing of the object. A waypoint comprises three-dimensional position and three-dimensional orientation information. The robot is taught how to perform the task by being guided through the various waypoints along the desired operating path during the programming. These waypoints are stored as instructions into a memory in the robot control unit. During operation of the robot, the program instructions are executed, thereby making the robot operate as desired.

Generally, the robot is programmed to perform a task by an human operator who manually jogs the robot to the desired positions along the path using a movable programming unit, a so-called teach pendant. An industrial robot usually carries an end-effector comprising a tool for performing the processing, for instance a welding tool or a painting tool. During programming of the path, the operator has to position and orient the end-effector in each waypoint along the path. Alternatively, if a 3D CAD model of the object exists, a person with a computer scientist background teaches the waypoints in a robot simulation system, so called off-line programming. Existing methods based on the CAD approach include visual feedback in an entirely virtual world, i.e. a virtual representation of both the real world and the object.

Either way, the teaching process is time consuming, troublesome, error prone, and in almost all cases requires several iterations before the program is acceptable. The CAD approach is costly, it requires a 3D CAD model of the object and it is not always intuitive to use. The complexity of the CAD-system requires the operator who is programming the robot to have knowledge about computer science. Such a person usually has little or no knowledge about the process. In the case of manual teaching, the control of the process is often difficult to optimize, but it has the advantage of indirectly utilizing implicit process knowledge of the operator. Another disadvantage with the manual teaching method is that it does not include any visual feedback to the operator, visualizing what has been programmed. The operator must use the trial and error method until the program is acceptable. For example, when the robot is to be taught how to paint an object and the entire surface of the object must be covered with color, it is impossible for the operator, without running the program afterwards, to see if he has missed some part of the surface. Thus, a number of iterations are required before the quality of the processing, in this example the painting, is satisfactory.

From the Japanese patent JP10011122 an improved method for teaching an industrial robot is known. The method includes presenting a visual feedback to the operator of the response resulting from an operation before the robot is operated. The visual feedback is represented together with the real object. The method comprises: measuring the current state of the robot and its environment by a CCD camera, the operator inputs robot operation information by the teaching pendant, estimating a response after the operation of the robot based on the inputted information, converting the estimated operation into information to be displayed as a picture, preparing picture information related to the response of the robot based on the information related to the camera and the estimated information, synthesizing the estimated response based on the picture information measured by the CCD camera and the picture information related to the response of the robot, and displaying a view comprising the robot, its environment and the estimated response of the robot. Thus, this method shows the next operation to be performed by the robot, but it does not provide any visual feedback to the operator regarding what he has been programmed.

SUMMARY OF THE INVENTION

The object of the present invention is to provide an improved industrial robot programming solution, which reduces the teaching time for the teaching process and increases the quality of the processing result.

According to one aspect of the invention, the object is achieved by means of the initially defined method, comprising: obtaining information about the position of the waypoints in relation to the object, storing the information about the position of the waypoints, simulating the robot path based on the received information about the waypoints and a model of the robot, generating a graphical representation of the robot path based on the simulated robot path, and displaying a view comprising the object and said graphical representation of the robot path projected on the object. This method improves the teaching process by visualizing the robot path in relation to the real object to be processed.

Obviously, it is not efficient if the robot moves the tool in straight lines between the waypoints specified by the operator. In order to achieve an efficient robot program, effecting the tool to pass through the specified waypoint at required speed and direction, a robot path has to be generated. The robot path is generated from a path simulator, simulating the robot path based on specified waypoints and a model of the robot. Computer generated information, representing the generated robot path, is displayed projected on the real object or on an image of the real object. Thus, it is possible for the operator to get extended visual feedback while making a new robot program related to a specific object. It is no longer necessary to run the robot program to view the result of the programming. Thereby, the number of iterations needed and thus the teaching time is reduced. The method is particularly advantageously during off-line programming. Another advantage of the method is that no 3D CAD model of the object is needed, since the generated graphic is projected on the real object or on an image of the real object. The programming time will be significantly reduced since the operator will be able to make a robot program at a higher quality level during the first iteration compared to today's methods.

According to a further embodiment of the invention, the method comprises obtaining information about the position of a display member in relation to the object and displaying said view in dependence of the position of the display member in relation to the object. Preferably, the orientation of the display member is also obtained and said view is displayed in dependence of the position and orientation of the display member. Thus the view displayed on the display member depends on its position and orientation in relation to the object. Thus, the operator can walk around the real object and se the result of what he has been teaching on the real object from different viewpoints.

According to a further embodiment of the invention, the method comprises: obtaining information about tool orientations in the waypoints, and generating a graphical representation of the tool orientations in the waypoints. During programming of the robot, the operator also needs to teach the robot how to orientate the tool. The programming is further simplified if the orientations of the tool in the waypoints are visualized to the operator.

According to a further embodiment of the invention, the method comprises: obtaining information about the process to be performed by the robot in connection with the robot path, simulating the result of the process based upon the obtained information about the waypoints, the obtained information about the process and a model of the process, generating a graphical representation of the simulated result of the process, and displaying a view showing the graphical representation of the simulated result of the process projected on the object. The information received is for example information about the tool configuration, such as the brush to be used in a painting process. Thereby, it is possible for the operator to estimate if the tool configuration chosen achieves the desired result. The final result of the process performed by the robot is presented to the operator in the real work environment. In the painting example, the result of the painting on the surface of the object is displayed. The method visualizes the outcome of the programming process to the operator, without the need of running the robot program or start the process. Preferably, it is possible for the operator to choose between visualizing the robot path, the result of the process, or both the robot path and the result of the process at the same time.

The visualization of the robot path and/or the outcome from the process may either be visualized, while the operator teaches a new robot program, or the robot path and/or the outcome from the process may be visualized as a function of time after the operator has completed the teaching, but before the robot program code is generated and downloaded to the robot controller. In both cases the operator is able to investigate the simulated result of the robot program without having to execute the new robot program in reality.

During the visualization of the robot processing as a function of time, the method supports stopping, pausing, restarting, and play backwards the simulation.

According to a further embodiment of the invention, the method comprises: obtaining information about which tool to be used to perform the process and about the orientation of the tool in the waypoints, simulating the tool performing the process, generating a graphical representation of the tool performing the process along the robot path based upon the obtained information about the position of the waypoints and the orientation of the tool, and displaying a view showing the tool moving along the robot path performing the process, based on the generated graphical representation of the simulation of the tool performing the process. For example, if the process is painting, a virtual paint-gun is displayed moving along the robot path performing the paint procedure and the paint being applied onto the object is shown. This visualization of the tool performing the process helps the operator to evaluate the taught robot program.

According to a further embodiment of the invention the view of the robot path and/or the result of the process is displayed as a function of time and the view is displayed proportional to the real-time. Real-time is the actual time it takes for the robot to move through the path performing the process. In a preferred embodiment the method further comprises: receiving information about a desired speed of the displaying of the view, and displaying the view in accordance with the desired speed. Preferably, the speed is altered in relation to the real-time. Sometimes the operator finds the real-time speed to be too fast, and thus wishes to slow down the speed. This embodiment of the invention makes it possible for the operator to alter the speed of the display.

According to a further embodiment of the invention the method comprises generating different graphical representations depending on whether the result of the process is displayed from a front side or a backside in relation to the object. Thus it is easy for the operator to distinguish between back and front. For example, a rendered paint stroke is shown with a front side and a backside with the backside rendered with transparent graphics. That makes it possible to turn off the graphical process information, for example the generation of paint stroke, when the backside of the paint stroke in shown.

According to a further embodiment of the invention the method comprises simulating the quality of the result of the process based on one or a plurality of predefined quality parameters and the model of the process, generating a graphical representation of the quality of the result of the process, and displaying the view based on the generated graphical representation of the simulation of the quality of the result of the process. Preferably, the method further comprises estimating whether the quality of the result does not meet one or several quality requirements, based on said simulation of the quality of the result of the process, and generating said graphical representation with a visual feedback to the operator where the process quality is estimated not to meet the quality requirements. In the paint process, the quality parameters for instance are overlap between paint strokes, parts of the object not covered by the paint, the paint thickness, the paint width, and sag of the paint. Thus, if the paint is estimated to be sagging or not covering the object, this will be shown by the generated graphics. This embodiment makes it possible for the operator to generate robot programs with high quality, without the need of executing the actual process.

According to a further embodiment of the invention the method comprises determining whether a point on the robot path is within the working range of the robot and notifying the operator if the point is outside the working range. Whether a point is within or outside the working range of the robot is determined based on a model of the robot. When the operator is specifying new waypoints or editing stored waypoints it is essential that the waypoints are within the working range of the robot. If a specified waypoint is outside the working range the operator is notified. It is also possible to check if any of the points on the robot path generated by the simulator is outside the working range.

When a point cases a singularity of the robot the point is outside the working rage.

According to a further embodiment of the invention the method comprises obtaining an image of the object, registering the generated graphical representation to the image of the object to provide a composite augmented reality image and displaying said view based on the composite augmented reality image. Preferably the image of the object is obtained by means of a camera. An augmented reality system merges computer-generated graphics of objects with the user's space in the real world. In this embodiment, the computer generated graphics of the waypoints and paths are merged with the image of the real object. Alternatively, the computer-generated graphics of waypoints and paths is displayed on see-through glasses worn by the operator. The generated graphics are projected on the glasses so that the operator can see the waypoints and paths projected in relation to the real world and the object. In order to perform a correct graphics registration, a tracking system is used to obtain the pose of the projection surface of the display device in relation to the object coordinate frame.

According to a further embodiment of the invention the method comprises obtaining information about the position of a pointing member pointing at points on or in the vicinity of the object, determining the position of the points in relation to the object coordinate frame based upon said obtained information, and storing the point being presently pointed out by the pointing member as a waypoint upon receiving a recording signal. Thus, the operator can specify the waypoints by walking around the object and pointing out the waypoints using the pointing member. The operator does not need any particular computer knowledge and he uses his knowledge and experience about the process during teaching of the robot.

According to a further aspect of the invention, the object is achieved by a computer program product directly loadable into the internal memory of a computer, comprising software code portions for performing the steps of the method according to the invention, when said product is run on a computer. The computer program product is provided either on a computer readable medium or through a network such as the Internet.

According to another aspect of the invention, the object is achieved by a computer readable medium having a program recorded thereon, where the program is to make a computer perform the steps of the method according to the invention, when said program is run on the computer.

According to still another aspect of the invention, the object is achieved by the initially defined system characterized in that it comprises a simulation unit, simulating the robot path based on the obtained information about the waypoints and a model of the robot, that the graphics generator, is adapted for generating a graphical representation of the simulated robot path, preferably along with process related information, and that the display member, is adapted for displaying a view showing said graphical representation of the simulated robot path projected on the object.

According to an embodiment of the invention the system comprises a handheld display device comprising the display member and a camera. Preferably the handheld display device is arranged so that the user seems to look directly through the display. A handheld display device is useful when a user needs to see the computer-generated information from time to time.

BRIEF DESCRIPTION OF THE DRAWINGS

The invention will now be explained more closely by the description of different embodiments thereof and with reference to the appended figures.

DETAILED DESCRIPTION OF PREFERRED EMBODIMENTS OF THE INVENTION

Figure 1:
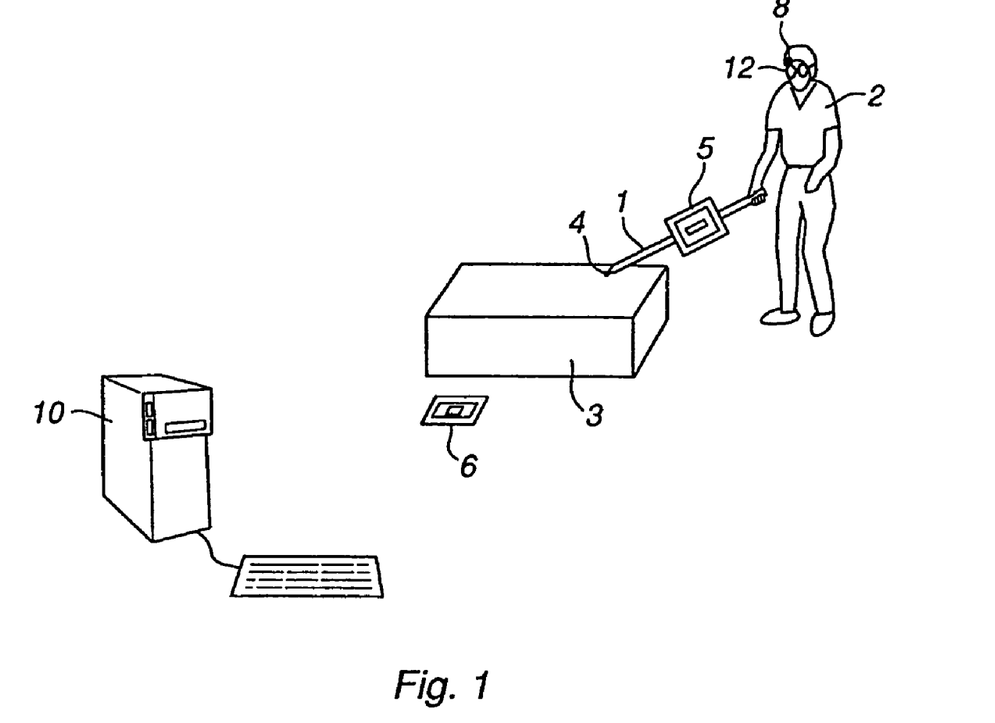
FIG. 1 shows a system for use in connection with programming of an industrial robot, according to an embodiment of the invention.

FIG. 1 illustrates a system for use in connection with programming of an industrial robot according to the present invention. The system comprises a pointing member 1 utilized by a human operator 2 for teaching the robot how to process an object 3. The pointing member can either be the processing tool itself, or a device particularly adapted for the purpose of teaching the processing of the object. The teaching comprises teaching a number of waypoints given in a specific sequence and located on or in the close vicinity of the object 3. Each waypoint comprises the position of a point on or in a close vicinity of the object, the orientation of a processing tool, such as a paintbrush, in the point, and data related to the process.

The operator holds the pointing member 1 in his hand and points at the point he wants to include in the path and orientates the pointing member as he wishes the processing tool to be oriented in the point. The operator records a point by activation of an activation member, which generates a recording signal. Upon receiving the recording signal the system stores the point as a waypoint. The pointing member 1 is provided with at least one marker 5, called a pointing marker, attached thereto. The pointing marker 5 is used for determining the position and orientation of the pointing member 1 in relation to the object. Alternatively, the pointing device may generate positions and orientations in a number of different ways, e.g. with inertial sensors, gyros, magnetic trackers, laser-based tracking systems, and ultrasonic trackers producing positions and orientations of the pointing device in relation to a fixed coordinate system.

The system is based on image recognition and requires at least one reference marker 6, which is fixed in relation to the object. The function of the reference marker 6 is to make up a reference point for image recognition algorithms, and a reference point to which computer generated graphics should be related. The system further comprises a camera unit 8. The camera unit 8 comprises an optical camera and an image grabber feeding the system with real-time image data. The camera can either be fixed in the space or moved around. For instance the camera can be attached to the operator's head or elsewhere on his body. In this embodiment the camera is attached to a par of glasses worn by the operator. All types of cameras can be used, but the demand for accuracy of position and orientation determines the type of camera. For example, a web camera, a video camera, or a CCD camera could be used. In another embodiment, more than one camera can be used, for example two cameras could be used arranged so as to provide stereoscopic images.

The camera provides either an analogue or a digital video signal, which is transferred to a computer 10 including a processor. The processor of the computer 10 is utilized for running the image recognition algorithms for determining the position and orientation of the pointing member 1 in relation to the object, for running algorithms generating a graphical representation of waypoints pointed out by the operator, for combining the generated graphics of the waypoints with the image provided by the camera to provide a composite augmented reality image and for running the simulation of the robot path and the result of the process.

The system further comprises a graphical display member 12 on which computer generated graphics is displayed to the operator. The graphical display member 12 visualizes the view of the camera combined with the computer-generated graphics. In this embodiment, the operator wears a head-mounted unit including a head-mounted graphical display 12 with the camera attached to the display. The head-mounted unit is a pair of wearable glasses on which the computer-generated information is projected in relation to the operator's position in the room. The view displayed depends on the position of the display member in relation to the object. The position of the display in relation to the object is determined by image recognition based on the image from the camera mounted on the display and markers (not shown) provided on the object, or some other tracking system, e.g. with inertial sensors, gyros, magnetic trackers, laser-based tracking systems, ultrasonic trackers, or vision-based feature tracking. Alternatively, a head-mounted display is used. In this embodiment, the camera is mounted to the display device, producing the same view as the operator would see. The computer-generated information is then registered with the camera image before displayed to the operator. In another embodiment, the display member is for example a handheld screen, such as a Personal Digital Assistant (PDA) screen, or a laptop screen. In the case of a PDA, the operator will hold the PDA in his hand while programming and the outcome of the programming will be visualized on the PDA screen. The display member could either give a single view or a stereoscopic representation of the graphics.

The pointing member 1 comprises a number of interaction means, such as push-buttons, which are adapted for interaction between the operator and the system. One of the interaction means comprises an activating member, which upon activation generates a recording signal for recording the point as a waypoint. A second interaction means is used for indicating whether the processing should be on or off between the waypoints. For example, if the process is painting, the interaction means indicates whether the paint is on or off. The system is provided with a third interaction means for input of information related to the process to the system. For example, in a paint application, it is possible to select one or several options for the paintbrush stored in the robot controller. For other applications, for example polishing, the options relates to the configuration of the polishing brush.

The relationship between the marker 5 and the tip 4 of the pointing member 1 must be known, so that the position and orientation of the tip can be determined. The image recognition algorithms recognize the pointing marker 5. The position of the tip of the pointing member and the orientation of the body of the pointing member in the reference marker coordinate system is determined by the recognition of the markers 5, 6. The recognition is based on the size and angle of the pattern on the marker in relation to the known pattern learned by the image recognition algorithms. The position is given in 3D as [x, y, z]. The orientation is given in 3D, for example as a rotation matrix [a 3×3 matrix].

While teaching the robot, the operator records waypoints to be passed through during the processing of the object and he also records process related information in connection with the waypoints by using the interaction means. In addition to the position, the orientation of the pointing member is recorded and the recorded orientation represents the orientation of the robot tool. Hence, the recorded sequence of waypoints creates the basis for the robot path in the robot program.

Figure 2:
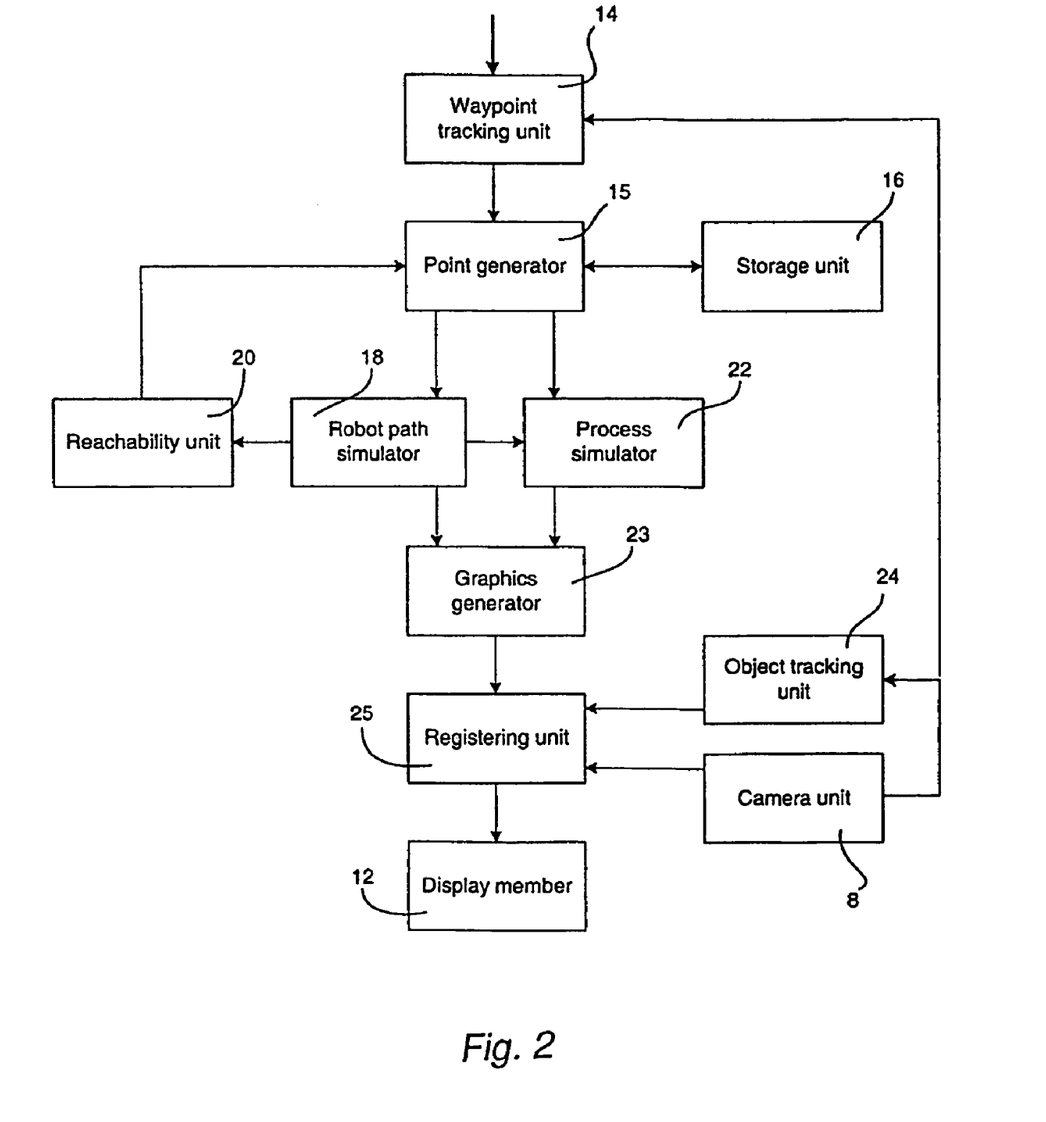
FIG. 2 shows a block diagram of the system according to an embodiment of the invention.

FIG. 2 shows a block diagram of a system according to an embodiment of the invention. The system comprises a tracking unit 14, which determines the positions and orientations of the way points taught by the operator. The tracking unit allows pose information (3DOF position and 3DOF orientation) to be specified in relation to a fixed object coordinate system. In this embodiment the position and orientation is determined by means of image recognition. Examples of other tracking units are ultrasonic tracking systems, magnetic tracking systems, tracking systems based upon inertial navigation, which uses accelerometers and gyros, mechanical arms, vision-based and optical systems, and hybrid systems combining the previously mentioned technologies. In this embodiment, input data to the tracking unit 14 is video signals from the camera unit 8 and information from the activating members of the pointing member 1, such as a record signal and process related information. Alternatively, the waypoints are loaded into the system from an external system, e.g. a CAD application, or from a database of stored waypoints and process information.

The system further comprises a point generator 15, which generates a sequence of points on the robot path with associated process related information based upon the waypoints specified from the tracking system. For a paint application, point data will typically be position and orientation of the brush, fan description, paint color, paint on/off, etc. The point generator will modify the waypoints specified by the operator depending on the process related information, such as brush number, and configuration parameters. Input to the point generator is waypoints with associated process information provided by the tracking unit 14. Output from the point generator 15 is a sequence of modified waypoints with process specific information. The point generator also adds new waypoints to the sequence of waypoints already specified by the operator. The sequence of waypoints generated by the point generator is stored in a storage unit 16, which also is used for storing system information.

A robot path simulator 18 simulates the actual robot path based on the list of waypoints and process information generated by the point generator 15. The robot path simulator comprises a model of the robot and the control system of the robot. The robot path simulator generates the actual robot path based on the waypoints, the process information, and the model of the robot and the robot control system. The generated robot path is used both for visualizing the robot movements in real time, i.e. as a function of time, and for visualizing a trace of the actual robot path. Input to the robot path simulator is the sequence of waypoints from the point generator and robot configuration data. The output from the robot path simulator is the actual robot path comprising position and orientation of the tool.

A reachability unit 20 checks whether a point is reachable for the robot end effector. The reachability unit 20 checks whether a point is within the working range of the robot and if the point is a singularity. When the operator specifies new waypoints or edits stored waypoints, it is essential that the waypoints and the path between the waypoints are reachable. Specifying a waypoint or a path which is not reachable, results in a visual message to the operator, e.g. by rendering the infeasible point or path with a dedicated color, pattern, or animation. In one embodiment of the system, the reachability of the waypoints specified by the operator is checked. In another embodiment of the system, the reachability of the actual robot path generated from the path simulator 18 is checked. This is advantageous since the specified waypoints may be feasible but the generated path between the waypoints might not be feasible, e.g. because of singularities or reachability constraints. The reachability is calculated based on a model of the robot and the robot controller, which model is the same as the one used by the robot path simulator 18. The calculations are possible thanks to knowledge about the position of the robot in relation to the object coordinate system. Singularities are possible to detect thanks to the model of the robot controller.

A process simulator 22 simulates the result from the process based on the waypoints, the process information from the point generator 15, the actual robot path, and a model of the process. Thus, the simulation depends on which process to be simulated. The process simulator uses a model of the process to be simulated. The process simulator may comprise more than one process model. For example it may comprise one model for a paint application, one model for a mill application and one model for a welding application. As an example, the model for the paint application comprises a combination of a mathematical model and a neural network model, where the mathematical model simulates the paint application, and the neural network simulates the paint result at the object surface. For instance, the width of the simulated paint-stroke is calculated from the brush number and the distance from the tool center point (TCP) to the object. The distance from the TCP to the object is fixed and is specified by the pointing member.

The process simulator 22 also calculates the process quality based on one or more predefined quality parameters. For paint applications, examples of relevant quality parameters are overlap between paint strokes, parts of the object not covered by the paint, paint thickness, paint width, and dripping of the paint. The quality simulation is based on the previous mentioned model of the process. For paint applications, a model of the paint process may be parameterized from a set of samples taken with different system and environmental parameters, such as brushes, paint type, humidity, and temperature. Based upon these data, a model of the process is generated and the paint thickness and/or stroke width is calculated. In order to calculate these properties, a model of the object may be needed. Such an object model can be provided in different ways. For example, by use of a CAD model, an optical system generating a 3D model of the object by automatic inspection or by using the tracking unit to specify points on the object and from this data, generate a simplified 3D model of the object. The process result should take into account if paint strokes overlap. If there exits a 3D model of the object, the width of the paint strokes is displayed as it would be on the real object.

Based on the simulation of the quality of the process, an estimation of whether the quality of the result does or does not meet one or several predefined quality requirements is done. The quality requirements are, for example, a minimum and a maximum value for the thickness of the paint and an interval for the overlap between two paint strokes. If the estimation shows that the process quality does not to meet the quality requirements a graphical representation with a visual warning to the operator is generated. For paint applications, the paint thickness is rendered in different ways, for example by a different color or a different pattern depending on whether the process result does or does not meet the quality requirement, or the simulated paint thickness may be illustrated continuously along the paint strokes by a graphical property, such as color, color intensity, or color saturation.

A graphics generator 23 generates a 3D graphical representation of the virtual information to be displayed based on information about the robot path from the robot path simulator and information about the process obtained from the process simulator 22. The graphics generator 23 generates a graphical representation of the simulated robot path and a graphical representation of the simulated result of the process. The graphics generator 23 also generates a graphical representation of the tool performing the process along the simulated robot path. The graphical representations are descriptions of the 3D graphical elements, specified in relation to the object coordinate frame. The system further comprises a registering unit 25, registering the generated graphical representation to the image of the object received from the camera unit 8, and providing a composite augmented reality image. The input to the registering unit 25 is the graphical representation from the graphics generator 23, video signals from the camera unit 8, and the position of the display device from the object-tracking unit 24. The output from the registering unit 25 is a composite augmented reality image, which is displayed on the display member 12.

The graphics generator 23, the registering unit 25, and the camera unit 8 form a graphics rendering system, which is configured for a video see-through display, i.e. computer generated graphics are combined with a captured real world image. Alternatively, the graphics rendering system could be configured for an optical see-through display, for which only computer-generated graphics are rendered. Further, the graphics rendering system is configured for either a single-camera system or for a stereoscopic camera system, having two cameras capturing real world images from slightly different positions, giving a tree-dimensional representation of the real world. The graphics rendered by the graphics rendering system is displayed to the operator on the graphical display 12. Thus, the system projects computer generated information, which simulates the specific process, directly onto and/or in relation to the real object to be processed. This information represents the robot path and process related information taught by the operator.

The system comprises an object-tracking unit 24, delivering information about the positional relation between the object and the display member 12. This information is input to the registering unit 25. Preferably, the object tracking is based on the same tracking method as the waypoint-tracking unit and uses the same tracking device. In this embodiment the object tracking is based on image recognition of the image received from the camera unit 8. The object-tracking unit could also be any of the before mentioned examples of tracking systems. An object-tracking unit is needed if the view to be displayed should depend on the position of the operator in relation to the object, which is the case for handheld display members and display members worn by the operator. This gives the operator the flexibility to move around the real object and immediately see the result at the real object of what he has been teaching.

In the following, a specification of the information to be presented to the operator is presented in connection with a paint application. The graphical representation of the simulated result of the process is displayed normal to the pointing direction of the tool along the path, i.e. normal to a TCP. For example, paint strokes should be rendered perpendicular to the longitudinal direction of the brush along the path.

Graphics that are obscured by a foreign object, or the object itself, should not be rendered or rendered in a different way for example by using different color or by using transparent graphics. Alternatively, the graphics are not rendered. A method according to the invention comprises determining whether a part or parts of the generated graphics are hidden and generating said graphical representation based on whether it is hidden or not. Whenever a computer generated graphical element is hidden by the object or some other object, e.g. the operator's hand or the pointing member, the overlaid computer generated graphics should not be rendered, or rendered in a different way, so that the operator can differentiate the graphical hierarchy.

The graphics generator is adapted for generating different graphical representations depending on whether the result of the process is displayed from a front side or a backside in relation to the object. For example, rendered paint strokes should have a front side and a backside, thereby making it easier for the operator to distinguish between back and front. The user may choose to visualize the paint strokes with the actual simulated paint width or the paint strokes may be visualized as a single-colored line segment. The width of the path visualizes, for example, the paint stroke when the paint is on.

For each waypoint specified by the operator, the specified brush number is displayed. A list of brushes is defined prior to the programming procedure and consists typically of three or four parameters that must be tuned to each other. Typical parameters are fan width, paint flow, atomizing airflow, shape airflow, high-voltage level, paint type, and paint color. The final goal is to have a brush with a defined width giving a uniform paint thickness within maximum and minimum values at a given paint speed. At least one specific brush may be defined as "paint-off", where paint flow, fan width, and airflow are all "0", alternatively paint flow is "0", while the other brush parameters are not "0".

In one embodiment of the invention, a graphical representation of the relevant tool is shown moving through the generated robot path in real time. The relevant process information is overlaid the robot path, where this is specified in the program, so that the operator can verify the resulting robot program in real time. The speed of the display is defined in the graphic settings and may be altered during the actual display. The operator can specify how fast this simulation should be performed in relation to real time. For example, the operator can choose to display the simulation in slow motion. It is possible to stop, pause, play backwards, and restart the display of the simulation.

It is possible to configure how graphics are presented on the graphical display member. For instance, the operator may choose to select or de-select one or more of the graphical descriptions.

Figure 3:
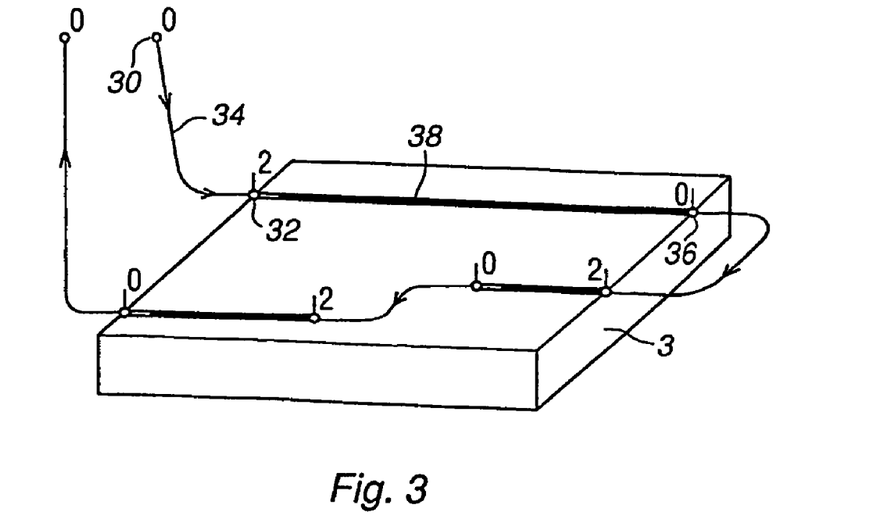
FIG. 3 shows examples of an augmented reality view showing a graphical representation of the robot path projected on a real object and path information.

FIG. 3 is an example of a view shown on the display. The view comprises the object 3 and a graphical representation of the recorded waypoints 30, 32 and the path between the waypoints, projected on the object and path information. Each waypoint 30, 32 taught by the operator is displayed as a dot. Each dot is provided with process information related to that waypoint, such as the brush number. If the displayed brush number is "0" painting is off. The simulated robot path 34 is displayed as a line between the waypoints 30, 32. Note that the generated path is not straight line between the waypoints. The robot path simulator generates the robot path, so that the tool passes through the waypoints at required speed and direction and then a smooth curve is to prefer before an angle.

For each waypoint specified by the operator, information regarding the orientation of the tool is displayed. This is indicated by a small octagonal coordinate system showing the x, y, and z directions. Preferably, each direction has a specific color code. The graphic generator also generates graphics representing the direction of the robot movement by adding arrows to the robot path shown. If the paint is on between two neighboring waypoints 32, 36, the paint stroke is visualized between the two waypoints. The view shows a simulation of the resulting robot path and the paint result.

Figure 4A:
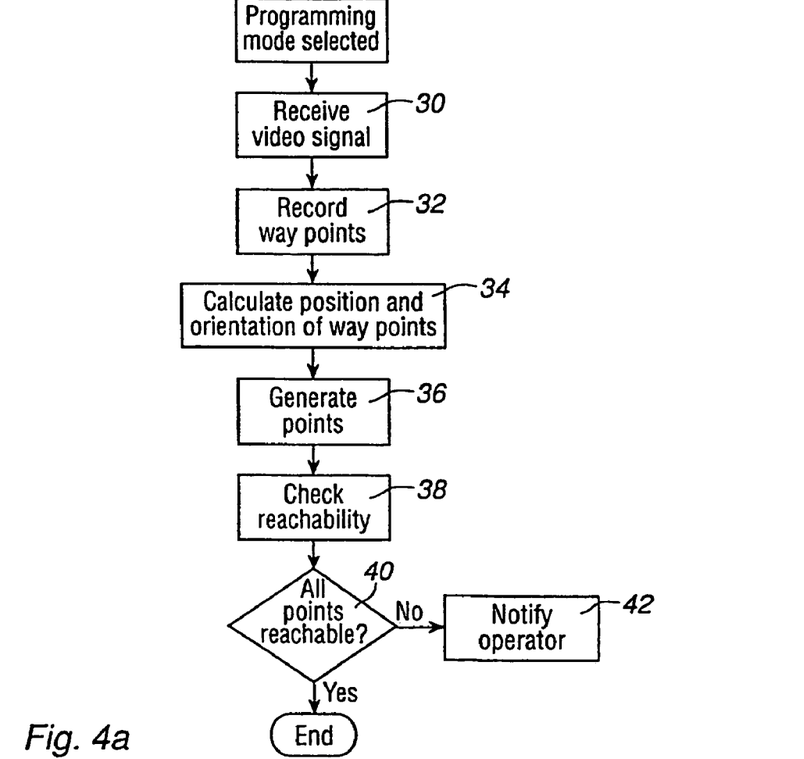
FIGS. 4a and 4b show flow charts of a method according to the invention for teaching an industrial robot a path according to an embodiment of the invention.
Figure 4B:
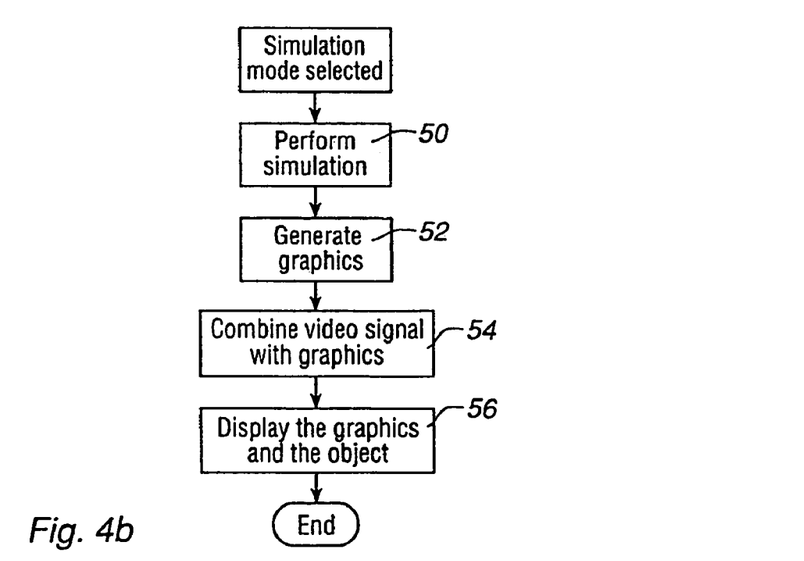

FIGS. 4*a* and 4*b* are flow chart illustrations of the method and the computer program product according to an embodiment of the present invention. It will be understood that each block of the flow chart can be implemented by computer program instructions. The system can take three operational modes: a programming mode, a simulation mode, and an edit mode. The operator chooses the system mode. In the programming mode, the user specifies the waypoints and input information about the process. In the simulation mode the robot path and/or the process are simulated and displayed to the operator. After the way points has been specified by the operator, alternatively after the robot program has been loaded into the computer's memory from the storage device, the user may set the system in edit mode. In edit mode, it is possible to remove stored waypoints, change the position of stored waypoints, change the orientation of stored waypoints, and change process related data, such as brush number of stored waypoints.

FIG. 4*a* shows the method steps when the system is in the programming mode. In block 30, a continuous stream of video signals is received from the camera unit 8. The image obtained comprises the object and the markers. In block 32, the system receives a record signal from the operator and an image is captured for use by the image recognition. Process information specified by the operator is received and stored. In block 34, the markers are recognized by the image recognition, and the position and orientation of the pointing member are calculated in relation to the location of the object and stored. When the operator has recorded the waypoints, the point generator generates a list of points on the path, block 36. In block 38 it is checked whether the points of the list are reachable, i.e. within the working range of the robot and not singularities. If a point is outside the working range or is a singularity, the operator is notified, block 40, 42. When the operator has recorded the waypoints, he may change to the simulation mood.

FIG. 4*b* shows the method when the simulation mode is selected. Before the simulation is started, the operator has to specify what he wants to be simulated. He could choose either to simulate only the robot path or simulate both the robot path and the process. In block 50, the simulation is performed based on the list of waypoints with process specific information generated during the programming mode and a model of the robot, a model of the robot controller and a model of the process. The simulation depends on the choice of the operator about what he wants to view. A graphical representation is generated of the robot path and/or the result of the process based on the simulation, block 52. As seen in block 54, the received video signal is combined with the generated graphics including registering the generated graphical representation to the image of the object to provide a composed augmented reality image. A view of the combined video signal and graphics is displayed, block 56. The generated graphics shows, for example, whether processing is on or off. The display visualizes the view of the camera combined with the generated graphics.

The software used for implementing the method according to the invention is partly based on software known to those skilled in the art. For example, the position and orientation may be generated in ARToolKit based on the position and orientation of the pointing marker in relation to the reference marker. The ARToolKit is developed by Washington University and the University of Hiroshima and is an open-source software library that enables augmented reality applications to be built using accurate computer vision-based tracking techniques. For the application interface, the software Open GL may be used. OpenGL provides a library of 2D and 3D functions including modeling alterations, color, light and shade functions. Microsoft Vision SDK is a library for writing programs to perform image manipulation and analyses on computers. The augmented reality software includes algorithms for drawing graphics, such as points and lines, transferring positions and orientations between different coordinate systems, extracting and generating a sequence list of positions and orientations, capturing process related information, and drawing advanced graphics, such as color-coded points and lines representing paint strokes with different widths and orientations.

The method according to invention is an off-line programming method, i.e. the method may be used outside the robot and the robot controller.

The present invention is not limited to the embodiments disclosed but may be varied and modified within the scope of the following claims. For example, the present system is not limited to augmented reality systems utilizing a composed video image but may also be utilized in see-through augmented reality systems, in which only the computer generated graphics are presented to the user who views the graphics on a see-through lens with the real world in the background. The only difference between the two systems is the translation of the camera coordinates into eye coordinates to compensate for the change in perspective between the camera images and the actual real-world perspective of the user. In either case, computer generated graphics are registered to objects in the real world. In the see-through case, the computer-generated graphic is combined with the real-world object by the user rather than in the creation of a composed video image.

Alternatively, the waypoints are loaded into the system from an external system, e.g. a CAD application, or from a database of stored waypoints and process information.

In one embodiment the system comprises a handheld augmented reality display device. The operator holds the handheld display device, showing the real world combined with overlaid computer-generated graphics. The computer-generated graphics may represent process related information, e.g. the programmed robot path, process specific information, target points and events. Either the operator's movements of his hand with a gesture-based recognition system or a pointing and interaction device is used to specify the process related information to the system.

The computer-generated information represents operator input for robot programming. The operator utilizes the handheld AR display to see the result of what he is doing while he is making a new robot program. The handheld display has a camera integrated with the same field of view as the display. The camera captures live video of the real world. The system combines and synchronizes the live video with computer-generated graphics representing the operator's input and presents it on the handheld AR display. The operator can freely move the handheld AR display in the environment, allowing the operator to see the local environment including the object from different viewpoints with overlaid computer generated graphics. The operator "looks" through the handheld AR display to see the generated robot program in relation to the real object.

Figure 5:
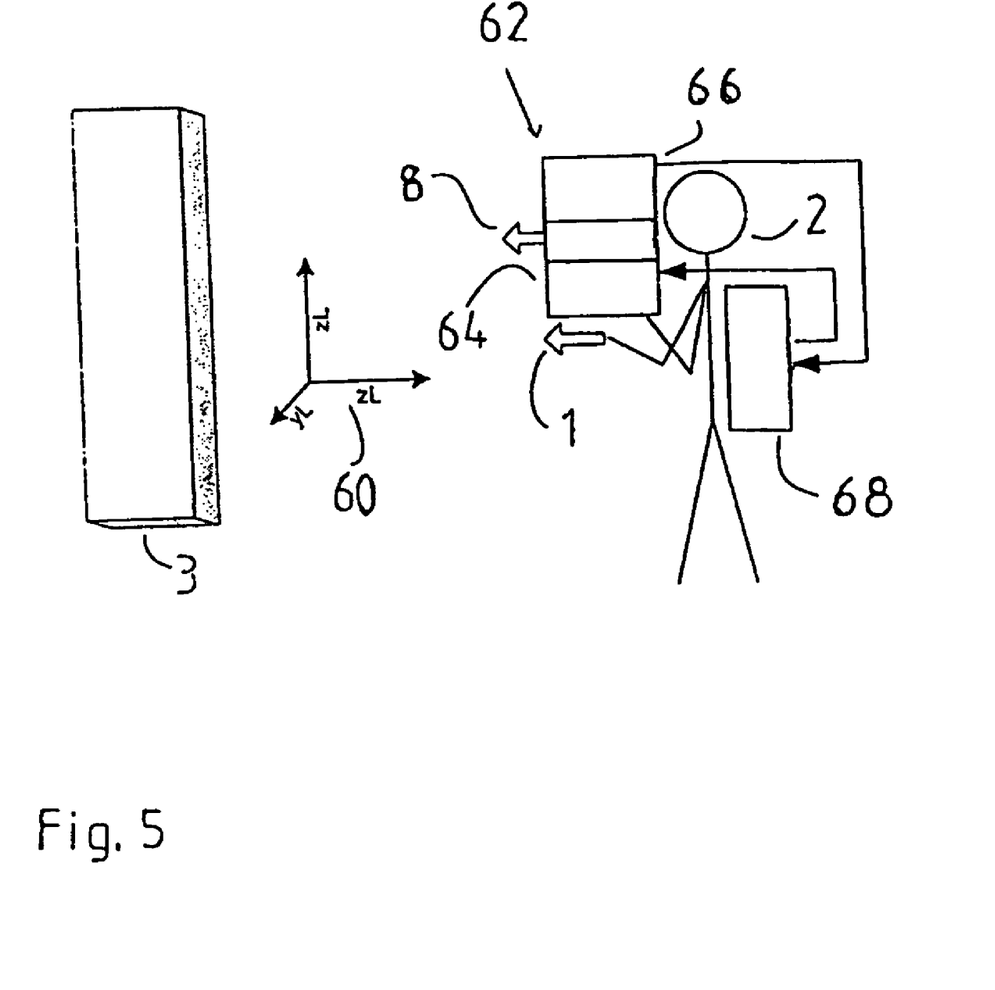
FIG. 5 shows an embodiment of the invention comprising a handheld display device.

A system according to this embodiment is shown in FIG. 5. The system comprises a handheld interaction/pointing device 1 with a tracking system for determining its position and orientation in relation to a world coordinate system 60. Alternatively the system comprises a gesture-based recognition system comprising a recognition system for recognizing and determining the position and orientation of a hand or fingers in relation to the world coordinate system. The system further comprises a handheld display device 62, e.g. a tablet PC or a PDA (Personal Digital Assistant). The display device comprises a display member 64, a camera 8 for capturing a stream of images of the environment mounted on or integrated with the display device 64. The camera 8 will be mounted in a fixed position in-relation to the display device 64. The display device will be located along the camera view axis and at the camera's image plane.

The system further comprises a tracking system 66 for determining the position and orientation of the display devices. The tracking system is preferable mounted on the display device. The system also comprises a system for generating an augmented reality representation of computer-generated graphical information overlaid the real world representation. The operator 2 movements are sensed through the display tracking system 66.

A wearable computer 68 contains the necessary software in order to generate the augmented reality environment based upon the video stream from the camera 8 and the computer-generated graphics. The wearable computer 68 also contains the necessary software needed to perform the desired task or process, e.g. generating a robot program and performing reachability check. Further, the wearable computer will generate the graphics, which will provide the augmented reality view. Finally, the wearable computer will contain a storage media in order to save, and restore previously saved, information. Communication of the information from the interaction/pointing device 1 to the wearable computer 68 is done through a wired or wireless link. The operator carries the display device 62 which will provide him/her with an augmented reality view of the environment. The display device is of "video see through" type.

Video see-through is used to generate and present an augmented reality world at the handheld AR display device. The camera integrated with the display device is used to capture a live video stream of the real world. The camera is located in relation with the display in such a way that it provides the same view, as the user would get by looking "through" the display device. The live video stream combined with computer-generated graphics is presented in real-time at the display device. Additional functionality includes camera zooming with output of the actual camera focal length. This will enable the system to display the computer-generated graphics correctly while zooming. The camera may also be used for vision-based tracking if vision-based tracking is used as the tracking system.

The invention claimed is:

1. A method in connection with programming of an industrial robot, comprising teaching the robot a path having a number of waypoints located on or in the vicinity of an object to be processed by the robot, the method comprising:
obtaining information about the position of the waypoints in relation to the object,
determining whether a point on the robot path is within the working range of the robot, and notifying the operator if the point is outside the working range of the robot,
storing the information about the position of the waypoints,
simulating the robot path based on the received information about the waypoints and a model of the robot,
generating a graphical representation of the robot path based on the simulated robot path, and
displaying a view comprising the object and said graphical representation of the robot path projected on the object.

2. The method according to claim 1, further comprising:
obtaining information about tool orientations in the waypoints, and
generating a graphical representation of the tool orientations in the waypoints.

3. The method according to claim 1, further comprising:
obtaining information about the process to be performed by the robot in connection with the robot path,
simulating the result of the process based upon the obtained information about the waypoints, the obtained information about the process and a model of the process,
generating a graphical representation of the simulated result of the process, and
displaying a view showing the graphical representation of the simulated result of the process projected on the object.

4. The method according to claim 3, further comprising:
obtaining information about which tool to be used to perform the process and about the orientation of the tool in the way-points,
simulating the tool performing the process,
generating a graphical representation of the tool performing the process along the robot path based upon the obtained information about the position of the waypoints, the orientation of the tool, and
displaying a view showing the tool moving along the robot path performing the process, based on the generated graphical representation of the simulation of the tool performing the process.

5. The method according to claim 3, further comprising:
simulating the quality of the result of the process based on one or a plurality of predefined quality parameters and the model of the process,
generating a graphical representation of the quality of the result of the process, and displaying the view based on the generated graphical representation of the simulation of the quality of the result of the process.

6. The method according to claim 5, further comprising:
estimating whether the quality of the result does not meet one or several quality requirements, based on said simulation of the quality of the result of the process, and
generating said graphical representation with a visual warning to the operator where the process quality is estimated not to meet the quality requirements.

7. The method according to claim 1, wherein the view is displayed as a function of time and it is displayed proportional to the robot movements in real-time.

8. The method according to claim 7, further comprising:
receiving information about a desired speed of the displaying of the view, and
displaying the view in accordance with the desired speed.

9. The method according to claim 1, wherein it comprises obtaining an image of the object, registering the generated graphical representation to the image of the object to provide a composite augmented reality image and displaying said view based on the composite augmented reality image.

10. The method according to claim 9, wherein the image of the object is obtained by means of a camera.

11. The method according to claim 1, wherein the steps obtaining and storing information about the position of the waypoints in relation to the object further comprise:
obtaining information about the position of a pointing member pointing at points on or in the vicinity of the object,
determining the position of the points in relation to the object based upon said obtained information,
storing the point being presently pointed out by the pointing member as a waypoint upon receiving a recording signal.

12. The method according to claim 1, further comprising:
obtaining information about the position of a display member in relation to the object and displaying said view in dependence of the position of the display member in relation to the object.

13. A method in connection with programming of an industrial robot, comprising teaching the robot a path having a number of waypoints located on or in the vicinity of an object to be processed by the robot, the method comprising:
obtaining information about the position of the waypoints in relation to the object;
storing the information about the position of the waypoints;
simulating the robot path based on the received information about the waypoints and a model of the robot;
generating a graphical representation of the robot path based on the simulated robot path;
displaying a view comprising the object and said graphical representation of the robot path projected on the object;
obtaining information about a process to be performed by the robot in connection with the robot path;
simulating the result of the process based upon the obtained information about the waypoints, the obtained information about the process and a model of the process;
generating a graphical representation of the simulated result of the process;
displaying a view showing the graphical representation of the simulated result of the process projected on the object;
simulating the quality of the result of the process based on one or a plurality of predefined quality parameters and the model of the process;

generating a graphical representation of the quality of the result of the process; and displaying the view based on the generated graphical representation of the simulation of the quality of the result of the process.

14. The method according to claim 13, further comprising:

estimating whether the quality of the result does not meet one or several quality requirements, based on said simulation of the quality of the result of the process, and generating said graphical representation with a visual warning to the operator where the process quality is estimated not to meet the quality requirements.

15. A method in connection with programming of an industrial robot, comprising teaching the robot a path having a number of waypoints located on or in the vicinity of an object to be processed by the robot, the method comprising:

obtaining information about the position of the waypoints in relation to the object;

storing the information about the position of the waypoints;

simulating the robot path based on the received information about the waypoints and a model of the robot;

generating a graphical representation of the robot path based on the simulated robot path;

displaying a view comprising the object and said graphical representation of the robot path projected on the object; and obtaining information about the position of a display member in relation to the object and displaying said view in dependence of the position of the display member in relation to the object.

* * * * *